United States Patent [19]

Wijnholds

[11] Patent Number: 5,953,717
[45] Date of Patent: Sep. 14, 1999

[54] ITERATIVE SEARCH METHOD BUILDS KEY LIST FOR SPEEDING UP FUTURE SEARCHES

[75] Inventor: Jan Wijnholds, Eindhoven, Netherlands

[73] Assignee: U.S. Philips Corporation, New York, N.Y.

[21] Appl. No.: 08/888,902

[22] Filed: Jul. 7, 1997

[30] Foreign Application Priority Data

Jul. 8, 1996 [EP] European Pat. Off. .............. 96201901

[51] Int. Cl.⁶ .................................................. G06F 17/30
[52] U.S. Cl. .............................................. 707/4; 707/204
[58] Field of Search ................................ 707/3, 4, 2, 204

[56] References Cited

U.S. PATENT DOCUMENTS

| 5,058,002 | 10/1991 | Nakamura et al. | 364/200 |
| 5,204,958 | 4/1993 | Cheng et al. | 395/600 |
| 5,253,361 | 10/1993 | Thurman et al. | 395/600 |
| 5,261,075 | 11/1993 | Ouchi et al. | 395/425 |
| 5,276,872 | 1/1994 | Lomet et al. | 395/600 |
| 5,592,665 | 1/1997 | Lahaije | 395/604 |

FOREIGN PATENT DOCUMENTS

| 0646882A1 | 4/1995 | European Pat. Off. | G06F 17/30 |
| WO9734275 | 9/1997 | WIPO . | |

OTHER PUBLICATIONS

"Algorithms +data structures=probrams" by Niklaus Wirth, Prentice–Hall, 1976, ISBN 0–13–022418–9.

*Primary Examiner*—Thomas G. Black
*Assistant Examiner*—Michael J. Wallace, Jr.
*Attorney, Agent, or Firm*—Anne E. Barschall

[57] ABSTRACT

A method for executing an iterative search for a desired record (111) in an ordered list of records (102) residing on a relatively slow background memory (214) includes a number of steps for copying the keys at relevant positions (112,114,116) into a relatively fast foreground memory (206). The method according to the invention retains a selection (230) among those keys in the foreground memory (206) for speeding-up the searching of a next desired record.

10 Claims, 2 Drawing Sheets

ITERATIVE SEARCH METHOD BUILDS KEY LIST FOR SPEEDING UP FUTURE SEARCHES

BACKGROUND OF THE INVENTION

The invention relates to a method for in a relatively slow background memory searching a desired record in an ordered list of records through an iterative search along a particular search path comprising a number of branches, the actual search path being chosen from a plurality of predetermined and partially joint search paths, wherein each record has a unique identifying key and a given search-value identifies the desired record, the method comprising after selecting the first branch of the particular search path as the actual branch the steps of:

a) copying the key of a record at the terminating node of the actual branch into a relatively fast foreground memory and making a comparison between said key and the search-value;

b) selecting, under control of the comparison, one of the branches starting at said node as a new actual branch, or selecting the record having said key as the desired record;

c) repeating steps a) and b) for the new actual branch, until the comparison yields correspondence or until the actual branch corresponds to a single record without the desired record having been found.

The invention further relates to an apparatus for in a relatively slow background memory searching a desired record in an ordered list of records through an iterative search along a particular search path comprising a number of branches, the actual search path being chosen from a plurality of predetermined and partially joint search paths, wherein each record has a unique identifying key and a given search-value identifies the desired record, the apparatus comprising:

a) read means for copying the key of a record at the terminating node of the actual branch into a relatively fast foreground memory and making a comparison between said key and the search-value;

b) selection means for selecting, under control of the comparison, one of the branches starting at said node as a new actual branch, or selecting the record having said key as the desired record;

c) repeat means for repeated activation of the read means and the selection means for the new actual branch, until the comparison yields correspondence or until the actual branch corresponds to a single record without the desired record having been found.

The invention further relates to a TMC receiver for the reception of traffic messages, comprising a receiving unit for the reception of a search-value and a reading unit for reading data from a background memory.

An example of the above-mentioned iterative search is the so-called binary search. Binary search is a well known method for searching a desired record in an ordered list of records and is described for example on page 14 of the text book "Algorithms+data structures=programs" by Niklaus Wirth, Prentice-Hall, 1976, ISBN 0-13-022418-9. In the binary search technique, the key of the record halfway through the ordered list is compared with a given search value. If the key is not equal to the search-value then the result of the comparison determines whether the desired record is to be found in the first half of the list or in the second half of the list. Subsequently, the key of the record halfway the respective half of the list is compared with the search-value. These steps of comparing the key and of dividing the list into two parts are repeated until the desired record is found or until it is determined that the desired record is absent.

It is known to apply the binary search technique to the searching of a list of records which resides in a relatively slow background memory. In such a case, the step of comparing the key of a record in the list includes copying at least the key of that record from the background memory into the relatively fast foreground memory in which the program executing the binary search is running. The known method has a problem in that it takes a relatively long time to copy the key from the background memory into the foreground memory. This significantly slows down the program executing the binary search since usually various comparison steps are required and, therefore, various keys have to be copied from the background memory into the foreground memory.

OBJECTS AND SUMMARY OF THE INVENTION

It is an object of the invention to provide a method of the kind set forth which requires less time for searching records. This object is achieved according to the invention in a method which is characterized in that a predetermined selection from among the keys copied is retained in the foreground memory in order to speed-up the searching of a next desired record. When applying the iterative search technique, there is a high probability for certain records in the list to be inspected. The record referred to by the node terminating the first branch will always be inspected. Subsequently, if this record is not the desired record, the record referred to by the node terminating one of the next branches of the search paths will be inspected, possibly followed by the record referred to by terminating node of the next branch. Because, as provided by the invention, a number of the keys of these records are kept in the foreground memory, the first steps of the search for a next desired record do not require access to the background memory for copying these keys. This saves a considerable amount of time and speeds up the program executing the search. The invention achieves this advantage by storing in the foreground memory only a very small amount of information compared to the information stored in the background memory.

An advantageous embodiment of the method according to the invention is a method wherein the iterative search is a binary search and comprises the steps of:

a) copying the key of a record halfway the actual list into a relatively fast foreground memory and making a comparison between said key and the search-value;

b) selecting, under control of the comparison, either the first or the second half of the actual list as a new list, or selecting the record having said key as the desired record;

c) repeating steps a) and b) for the new list, until the comparison yields correspondence or until the actual list has a single record without the desired record having been found.

When applying the binary search technique, there is a high probability for certain records in the list to be inspected. The record halfway the list will always be inspected in the first step. Subsequently, if this record is not the desired record, the record at one quarter or at three quarters of the list will be inspected possibly followed by the inspection of a record at one of the four (odd) one eight positions in the list.

Because, as provided by the invention, a number of the keys of these records are kept in the foreground memory, the first steps of the search to a next desired record do not require access to the background for copying these keys.

An advantageous embodiment of the method according to the invention is characterized in that the method comprises an initialization step which includes the copying of at least the key of the record residing halfway through the list into the foreground memory. This initialization step is an easy way to speed up searches for desired records, since every search includes a first step for comparing the respective search-value with the key of the record halfway the list of records. Due to the initialization step, this key is present in the foreground memory and will be retained in that memory for further searches.

It is a further object of the invention to provide an apparatus of the kind set forth which allows faster execution of searches in the ordered list of records. This object is achieved according to the invention in an apparatus which is characterized in that the apparatus comprises storing means for storing a predetermined selection from among the keys copied in the foreground memory in order to speedup the searching for a next desired record. Because the apparatus keeps the keys of the records that have a high probability of being inspected during the iterative search in the foreground memory, the apparatus requires fewer accesses to the background memory. This saves time and enables the apparatus to search more quickly for a next desired record in the list of records in the background memory.

A TMC receiver according to the invention is characterized in that the TMC receiver comprises an apparatus according to any of the claims 5 to 8 for searching a record in the background memory. A TMC receiver receives a traffic message concerning a certain location. The message contains a location code corresponding to that location and the receiver reads data for that location from the background memory. As described European patent application EP 826206A1 (PHN 15.723), the background memory comprises an index for the location data. This index comprises an ordered list of records, each record comprising a location code as a key to that record. The TMC receiver is a consumer apparatus and, consequently has a relatively small foreground memory for running the program, typically of the order 50 kbytes. The TMC receiver according to the invention has the advantage that only a very small amount of information need be stored in the foreground memory so as to achieve considerable speeding up of the search for a desired record in the index.

BRIEF DESCRIPTION OF THE DRAWINGS

The invention and its attendant advantages will be further elucidated with the aid of exemplary embodiments and the accompanying schematic drawings, whereby.

Corresponding features in the various Figures are denoted by the same references.

DETAILED DESCRIPTION OF THE PREFERRED EMBODIMENT

Figure 1:
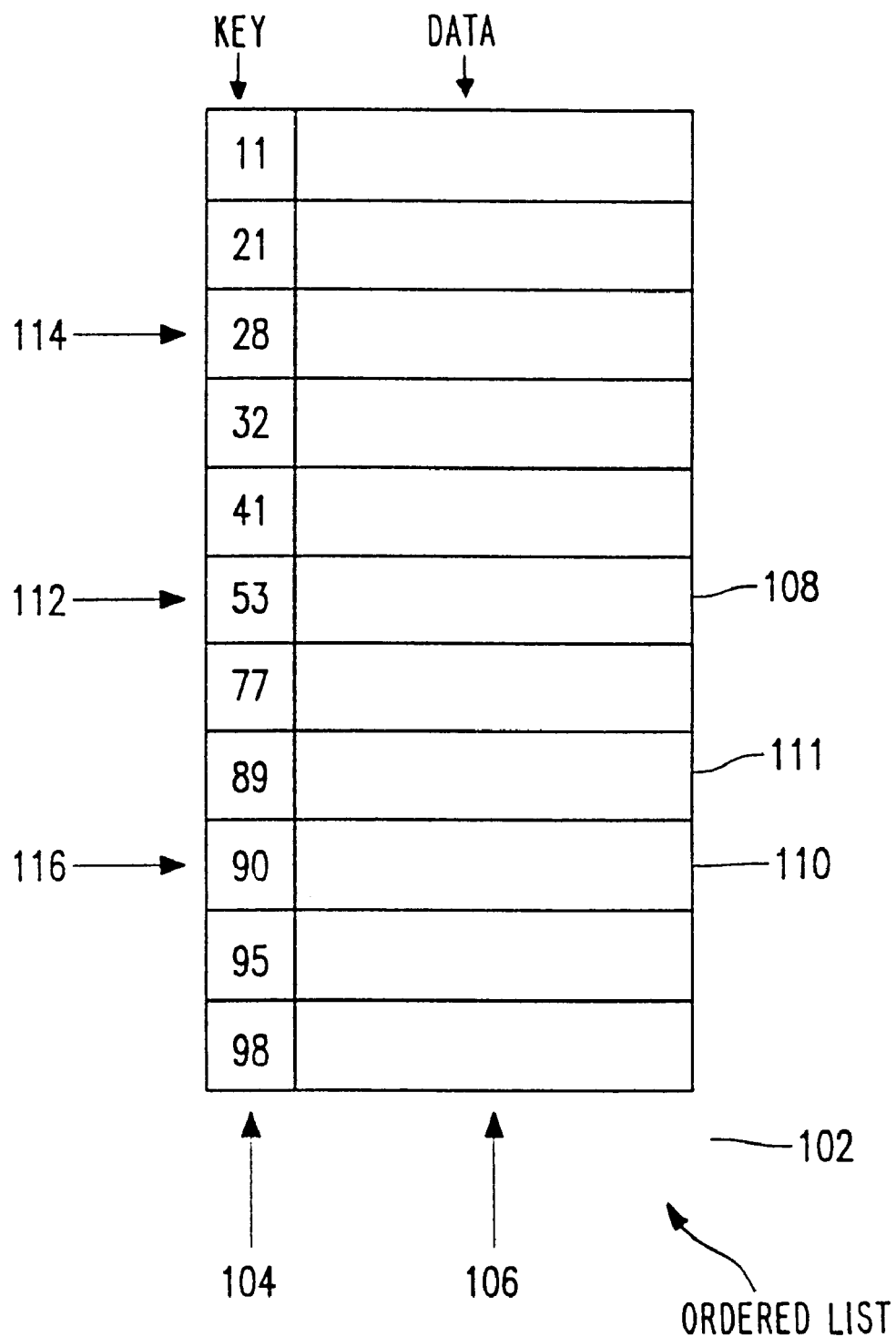
FIG. 1 shows a short example of an ordered list of records as used in the invention, FIG. 2 schematically shows some elements of the apparatus according to the invention, and FIG. 3 schematically shows a number of elements of a TMC receiver according to the invention.

FIG. 1 shows a short example of an ordered list of records as used in the invention. The list 102 comprises 11 records, each with a key and a data part. The key is a field in column 104 and the data part is a field in the column 106. The structure and contents of the data part is of no importance to the invention. The records are ordered from the top in ascending order with respect to the value of the key. The list 102 concerns a very short list for convenience of presentation in the Figure. In an embodiment of the invention the list typically includes between 10000 and 20000 records and can include up to 65535 records. An example of searching this list for a record with a key of value 89, using the binary search technique, includes the following steps. The key of the record halfway the list, here the key with value 53 of the record 108 at position 6, is compared with the search-value 89. Because the value of the key is smaller than the search-value, the desired record is, if present, located in the upper half of the list. Subsequently, the key of the record halfway the upper half of the list is compared with the search value. In this example it concerns the record 110 at position 9 with a value of 90 for the key. Since this value is larger than the search-value, it is now known that the desired record is located in the lower half of the inspected, upper half of the complete list. It is to be understood that determining which record is located halfway through a list involves a degree of rounding off. After the mathematical centre between the upper and lower boundaries of a list has been established, this centre has to be translated into a discrete position in the list. This could be the record just below the mathematical centre or the record above it. Concerning the selection of the boundaries of a next half of a list to be searched and of the centremost record of a list, different rules are applied in the various algorithms implementing a binary search. In this particular example, after that record 110 has been inspected the next record could be the desired record 111 with a value of 89 for the key.

Because of the nature of the binary search algorithm, a number of the records in the list have a high probability of being inspected during a search. These are the records halfway through the list, halfway through the two halves of the list, and so on for the next levels down. In the example of FIG. 1, this includes records at positions 112, 114 and 116. Every binary search will start with the inspection of the record at 112 and in almost half the searches the records at position 114 at position 116 will be inspected.

Figure 2:
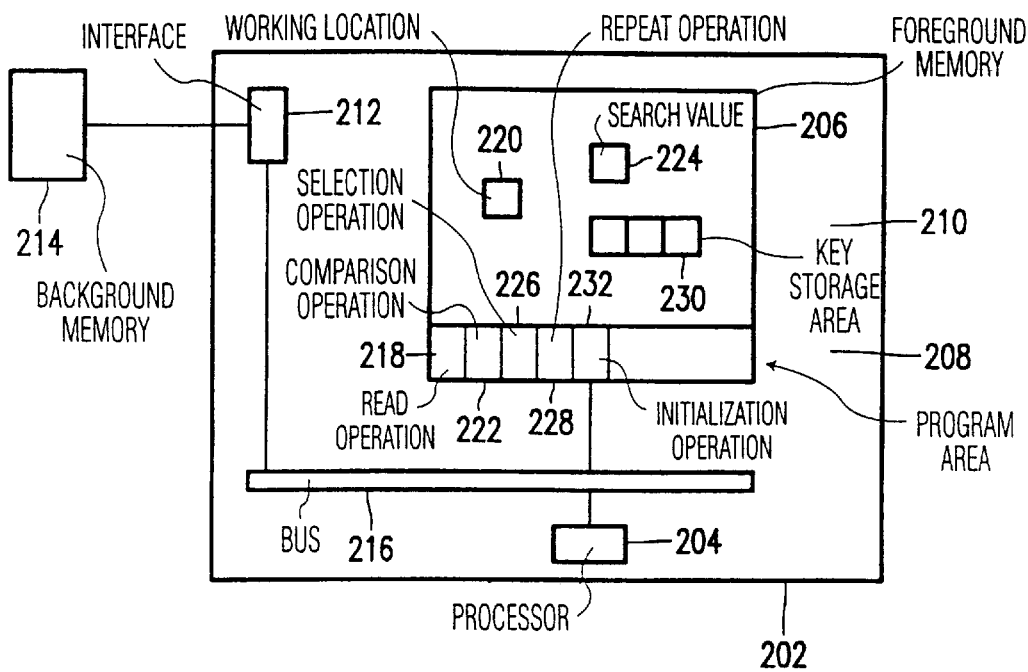

FIG. 2 schematically shows some elements of the apparatus according to the invention. The apparatus 202 comprises a processor 204 for execution of a program loaded in the foreground memory 206. The foreground memory has a program section 208, which stores various parts of the program for performing various tasks and a data section 210 in which various data can be stored for use in the program. The apparatus further comprises an interface 212 for reading information from background memory 214. The precise type of the background memory is not significant to the invention. The invention can be used advantageously when the foreground memory 206 is fast in comparison with the background memory 214. Examples of the background memory are: CD ROM, chip card and magnetic disk. The background memory 214 contains an ordered list of records of the kind shown in FIG. 1. The apparatus also comprises a bus 216 for the exchange of data and control information among the various parts of the apparatus. The program loaded in the foreground memory contains various parts for executing the binary search for a desired record in the list of records in the background memory. The program contains read means 218 for reading a key from a record in the list and placing it in a working location 220 in the foreground memory. The program also contains comparison means 222 for comparing the key with a search-value available in location 224. Furthermore, the program comprises selection means 226 for selecting a next half of the list to be searched and repeat means 228 for repeating the previous steps until the desired record is located. The apparatus comprises storage means 230 for storing a selected number of the keys in the foreground memory. These are in the example of FIG. 1, the keys of the records at positions 112, 114 and 116. Optionally, the apparatus comprises initialization means 232 that copy one or more of the keys in advance into the foreground memory.

Copying the selected keys and storing them in the foreground memory can be done in an initialization step preceding the search for a desired record. As soon as it has been determined from which list a record will be searched, the keys of the records at the relevant positions are copied and stored in the foreground memory. An alternative technique is to store the keys of the records at the relevant positions, while actually searching for a desired record. When the key of a record at such a relevant position has been copied into the foreground memory for comparison, it will be stored in the foreground memory for use in a later search. The latter technique gradually stores the keys of the relevant positions in the foreground memory. In that case, when a key of such a position is needed, the program must first verify whether it has been previously read or not. The example in the Appendix, which is part of the program of an embodiment of the invention, applies the latter technique.

Figure 3:
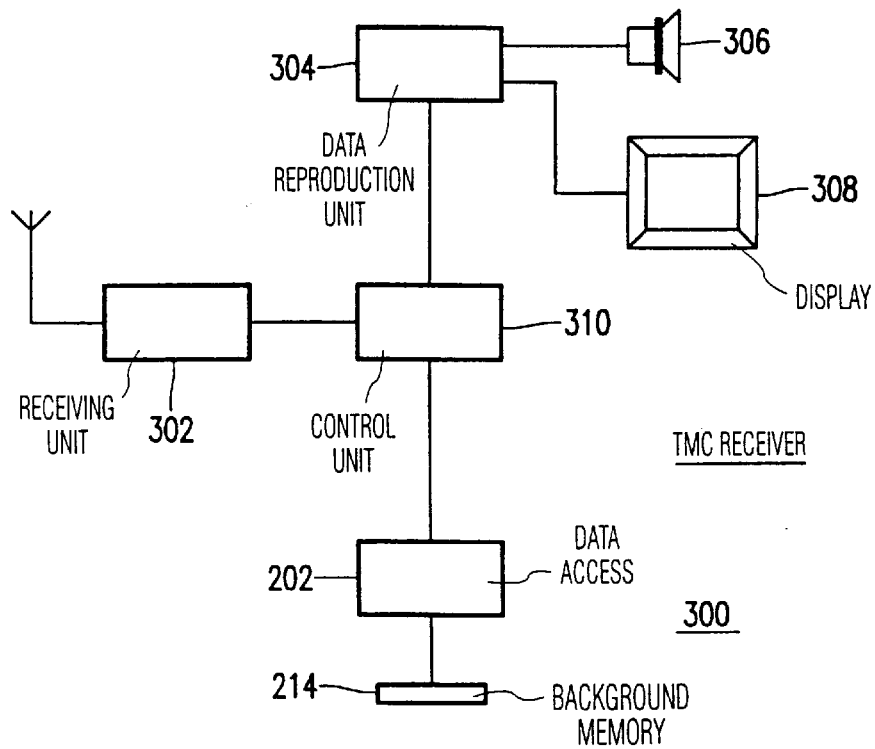

FIG. 3 schematically shows a number of elements of a TMC receiver according to the invention. A TMC receiver 300 can be seen as a car radio with the added functionality of receiving traffic messages and reproducing these for the driver. The TMC receiver comprises a receiving unit 302 for among others receiving traffic messages. Such a traffic message contains a location code identifying the location whereto the message relates. The TMC receiver furthermore comprises an apparatus 202 for accessing data related to the location code in the background memory 214. The TMC receiver comprises a unit 304 for the reproduction of the data via a speaker 306 and/or a display 308. Furthermore, the TMC receiver comprises a control unit 310 for controlling the various elements. The TMC receiver according to the invention comprises the apparatus 202 for speeding up the process of retrieving the location data from the background memory. In an embodiment of the TMC receiver, the background memory is a chip card which can contain up to 512 kbytes data. The list of ordered records can contain 65535 records, each with a key of 2 bytes. The size of the foreground memory of a TMC receiver can vary per model and is of the order of 50 kbytes. Accessing to a position on the chip card takes approximately 7/25 ms and subsequent reading takes approximately 1/25 ms per byte. When the list contains 15000 records, a binary search requires worst case 14 steps. This would traditionally take 14*9/25=5 ms. Application of the invention with storing of 63 keys, reduces the number of accesses to the background memory by 6. This saves more than 2 ms of time, because the accesses to the keys in the foreground memory are very fast and require very little time compared to the access time of the background memory. The actual number of keys to be stored in the foreground memory is a design choice for which a compromise must be found between the required memory capacity and the allowable search times.

APPENDIX

The functions "fast_bin_init" and "fast_bin_search" form part of an embodiment of the invention and are specified below in the programming language C. The key of a record on the background memory is read with a function called "tmc_loc-code_get", which is not further specified here. The array "fast_array" is used to store the keys and keep them in the foreground memory. The function "fast_bin_init" initializes this array with "0", being a value which is not used as a key in the records. The function "fast_bin_search" returns, for a search-value given in the parameter "search_value", in the parameter "index" the position number of the record in the index file in the background memory.

```
/* MACRO DEFINITIONS ==========================================*/
#define FALSE                    0
#define TRUE                     (!FALSE)
/* number of binary search levels to do from fast memory */
#define MAX_FAST_LEVELS          6
/* number of keys stored in fast memory */
#define MAX_FAST_INDEX           (1<<MAX_FAST_LEVELS)
/* TYPE DEFINITIONS ==========================================*/
typedef unsigned short           USHORT;
typedef USHORT                   LOC_CODE;
typedef unsigned char            BOOLEAN;
/* EXTERN FUNCTION DECLARATIONS ==============================*/
extern BOOLEAN tmc_loc_code_get(USHORT i, LOC_CODE * loc_code);
extern BOOLEAN fast_bin_init(LOC_CODE fast_array[ ]);
extern BOOLEAN fast_bin_search(LOC_CODE search_value, LOC_CODE fast_array[ ], USHORT nelem, USHORT *index);
/* GLOBAL DATA DECLARATIONS ==================================*/
LOC_CODE key_array[MAX_FAST_INDEX];
/* FUNCTIONS DEFINITIONS =====================================*/
extern BOOLEAN fast_bin_init(LOC_CODE fast_array[ ])
/* to be called every time a different slow memory array is used */
{
    register int i;
    /* reset fast array */
    for (i=0; i<MAX_FAST_INDEX; i++)
    {
        /* LOC_CODE 0 is not used for any location */
        fast_array[i] = 0;
    }
    return (TRUE);
}
```

```
extern BOOLEAN fast_bin_search(LOC_CODE search_value, LOC_CODE fast_array[ ], USHORT nelem, USHORT *index)
/* binary search algorithm in both fast and slow memory */
{
    long      min_index = 0L;                      /* lower boundary in slow memory */
    long      max_index = (long) nelem - 1L;       /* upper boundary in slow memory */
    long      slow_index;                          /* index in array in slow memory */
    int       fast_index;                          /* index in array in fast memory */
    int       min_fast = 0;                        /* lower boundary in fast memory */
    int       max_fast = MAX_FAST_INDEX;           /* upper boundary in fast memory */
    int       search_level = 0;                    /* number of searches performed */
    LOC_CODE key;
    while (min_index <= max_index)
    {
        /* slow_index is middle of minimum and maximum index */
        slow_index = (min_index + max_index)/2;
        /* check from which memory next needs to be read */
        if *search_level < MAX_FAST_LEVELS)
        {
            /* read key from fast memory */
            /* fast_index is middle of minimum and maximum index */
            fast_index = (min_fast + max_fast)/2;
            /* check whether element is stored in fast seacrh table */
            if (fast_array[fast_index] != 0)
            {
                /* read element at fast_index from fast search table */
                key = fast_array[fast_index];
            }
            else
            {
                /* read element at slow_index from slow search table */
                if (!tmc_loc_code_get(slow_index, &key))
                {
                    return (FALSE);
                }
                /* store element at fast_index in fast search table */
                fast_array[fast_index] = key;
            }
        }
        else
        {
            /* read element at slow_index from slow search table */
            if (!tmc_loc_code_get(slow_index, &key))
            {
                return (FALSE);
            }
        }
        /* check whether key is too small */
        if (key < search_value)
        {
            /* index too small: update lower slow and fast boundary */
            min_index = slow_index + 1;
            min_fast = fast_index;
        }
        else
        {
            /* check whether key is too large */
            if (key > search_value)
            {
                /* index too large: update upper slow and fast boundary */
                max_index = slow_index - 1;
                max_fast = fast_index;
            }
            else
            {
                /* search_value found in fast memory */
                /* return index */
                *index = slow_index;
                return (TRUE);
            }
        }
        /* increase number of search levels */
        search_level++;
    }
    return (FALSE);
}
```

I claim:

1. A method for in a relatively slow background memory searching a desired record in an ordered list of records through an iterative search along a particular search path comprising a number of branches, the actual search path being chosen from a plurality of predetermined and partially joint search paths, wherein each record has a unique identifying key and a given search-value identifies the desired record, the method comprising after selecting the first branch of the particular search path as the actual branch the steps of:

a) copying the key of a record at the terminating node of the actual branch into a relatively fast foreground memory and making a comparison between said key and the search-value;

b) selecting, under control of the comparison, one of the branches starting at said node as a new actual branch, or selecting the record having said key as the desired record;

c) repeating steps a) and b) for the new actual branch, until the comparison yields correspondence or until the actual branch corresponds to a single record without the desired record having been found;

characterized in that a predetermined selection from among the keys copied is retained in the foreground memory to speed up the searching of a next desired record.

2. The method as claimed in claim 1, wherein the iterative search is a binary search and comprises the steps of:

a) copying the key of a record halfway through the actual list into a relatively fast foreground memory and making a comparison between said key and the search-value;

b) selecting, under control of the comparison, either the first or the second half of the actual list as a new list, or selecting the record having said key as the desired record;

c) repeating steps a) and b) for the new list, until the comparison yields correspondence or until the actual list has a single record without the desired record having been found.

3. The method as claimed in claim 2, characterized in that the method comprises an initialization step which includes copying at least the key of the record residing halfway through the list into the foreground memory.

4. The method as claimed in claim 2, characterized in that the initialization step includes copying at least the key of the record residing at one quarter of the way through the list and at least the key of the record residing at three quarters of the way through the list into the foreground memory.

5. An apparatus for in a relatively slow background memory searching a desired record in an ordered list of records through an iterative search along a particular search path comprising a number of branches, the actual search path being chosen from a plurality of predetermined and partially joint search paths, wherein each record has a unique identifying key and a given search-value identifies the desired record, the apparatus comprising:

a) read means for copying the key of a record at the terminating node of the actual branch into a relatively fast foreground memory and making a comparison between said key and the search-value;

b) selection means for selecting, under control of the comparison, one of the branches starting at said node as a new actual branch, or selecting the record having said key as the desired record;

c) repeat means for repeated activation of the read means and the selection means for the new actual branch, until the comparison yields correspondence or until the actual branch corresponds to a single record without the desired record having been found;

characterized in that the apparatus comprises storing means for storing a predetermined selection from among the keys copied is retained in the foreground memory in order to speed the searching of a next desired record.

6. The apparatus as claimed in claim 5, wherein the iterative search is a binary search and wherein:

a) the read means are arranged for copying the key of a record halfway through the actual list into a relatively fast foreground memory and making a comparison between said key and the search-value; and b) the selection means are arranged for selecting, under control of the comparison, either the first or the second half of the actual list as a new list, or selecting the record having said key as the desired record.

7. The apparatus as claimed in claim 6, characterized in that the apparatus comprises initialization means for copying at least the key of the record residing halfway through the list into the foreground memory.

8. The apparatus as claimed in claim 6, characterized in that the initialization means are arranged for copying at least the key of the record residing at one quarter of the way through the list and at least the key of the record residing at three quarters of the way through the list into the foreground memory.

9. A TMC receiver for the reception of traffic messages, comprising a receiving unit for the reception of a search-value and a reading unit for reading data from a background memory, characterized in that the TMC receiver comprises an apparatus according to claim 5 for searching a record in the background memory.

10. A computer method for searching an ordered list embodied background memory device, the ordered list including a plurality of records, each record including a key field and a data field, the method comprising:

i. building a key field list in a foreground memory device as part of an iterative search, the foreground memory device being relatively faster than the background memory device, the building and search comprising:

a. identifying a branch point record in the ordered list corresponding to a branch point in for a tree type search of the ordered list;

b. storing the key field from the branch point record in the foreground memory;

c. comparing the key field of the branch point record with a search value;

d. selecting, in response to the comparing step, one of:
I. the branch point record; or
II. a new ordered list that is a portion of the ordered list delimited by the branch point record;

e. repeating steps a–d using the new ordered list, until the selecting yields the branch point record;

f. deriving the key field list from the keys stored in foreground memory during steps a–e; and ii. searching the ordered list from the background memory device anew for a new search value using the key field list stored in the foreground memory device in step i.

* * * * *